(12) United States Patent
Wang et al.

(10) Patent No.: US 12,533,004 B2
(45) Date of Patent: Jan. 27, 2026

(54) HEAT EXCHANGE DEVICE AND DISHWASHER

(71) Applicants: MIDEA GROUP [SHANGHAI] CO., LTD., Shanghai (CN); GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Wenpeng Wang, Foshan (CN); Hecheng Liu, Foshan (CN); Wenyong Yang, Foshan (CN)

(73) Assignees: MIDEA GROUP [SHANGHAI] CO., LTD., Shanghai (CN); GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 182 days.

(21) Appl. No.: 18/509,659

(22) Filed: Nov. 15, 2023

(65) Prior Publication Data

US 2024/0081608 A1    Mar. 14, 2024

Related U.S. Application Data

(63) Continuation of application No. PCT/CN2022/126246, filed on Oct. 19, 2022.

(30) Foreign Application Priority Data

Nov. 9, 2021   (CN) .......................... 202111322420.8

(51) Int. Cl.
A47L 15/00    (2006.01)
A47L 15/42    (2006.01)
(Continued)

(52) U.S. Cl.
CPC ........... *A47L 15/4285* (2013.01); *A47L 15/00* (2013.01); *A47L 15/4219* (2013.01);
(Continued)

(58) Field of Classification Search
None
See application file for complete search history.

(56) References Cited

U.S. PATENT DOCUMENTS

2012/0118339 A1    5/2012   Ertl et al.

FOREIGN PATENT DOCUMENTS

CN    102203339 A    9/2011
CN    106016836 A    10/2016
(Continued)

OTHER PUBLICATIONS

Midea Group Co., Ltd., ISRWO, PCT/CN2022/126246, Dec. 12, 2022, 6 pgs.
(Continued)

*Primary Examiner* — Levon J Shahinian
(74) *Attorney, Agent, or Firm* — Morgan, Lewis & Bockius LLP

(57) ABSTRACT

The present application provides a heat exchange device and a dishwasher. The heat exchange device includes an evaporator, a first liquid storage tank, a second liquid storage tank and a power unit. A medium inlet and a medium outlet are defined in the evaporator, the first liquid storage tank is in communication with the medium inlet, and the second liquid storage tank is in communication with the medium outlet and the first liquid storage tank. A liquid inlet and a gas discharge port are defined in the second liquid storage tank. The power unit is arranged between the evaporator and the first liquid storage tank, or between the evaporator and the second liquid storage tank, so as to drive a liquid medium to circularly flow between the first liquid storage tank, the evaporator and the second liquid storage tank.

18 Claims, 4 Drawing Sheets

(51) Int. Cl.
    *F24H 4/02*         (2022.01)
    *F24H 9/00*         (2022.01)
    *F24H 9/1809*     (2022.01)

(52) U.S. Cl.
    CPC ............ *A47L 15/4291* (2013.01); *F24H 4/02* (2013.01); *F24H 9/00* (2013.01); *F24H 9/1809* (2013.01); *Y02B 40/00* (2013.01)

(56) References Cited

FOREIGN PATENT DOCUMENTS

| | | | |
|---|---|---|---|
| CN | 205669888 | U | 11/2016 |
| CN | 106556208 | A | 4/2017 |
| CN | 107238146 | A | 10/2017 |
| CN | 109620082 | A | 4/2019 |
| CN | 109620083 | A | 4/2019 |
| CN | 208910121 | U | 5/2019 |
| CN | 211781960 | U | 10/2020 |
| CN | 109381148 | B | 7/2021 |
| EP | 3372139 | A1 | 9/2018 |
| EP | 3622875 | A1 | 3/2020 |
| JP | H 09196538 | A | 7/1997 |
| JP | H 1080392 | A | 3/1998 |

OTHER PUBLICATIONS

Midea Group Co., Ltd., IPRP, PCT/CN2022/126246, May 2, 2024, 5 pgs.
Midea Group Co., Ltd., Extended European Search Report, EP Patent Application No. 22891758.9, Jul. 2, 2024, 8 pgs.
Chinese First Office Action, Chinese Application No. 202111322420.8, mailed May 22, 2025 (15 pages).

HEAT EXCHANGE DEVICE AND DISHWASHER

CROSS-REFERENCE TO RELATED APPLICATIONS

The present application is a continuation of International (PCT) Patent Application No. PCT/CN2022/126246 filed on Oct. 19, 2022, which claims priority to Chinese patent application No. 202111322420.8, filed on Nov. 9, 2021, the contents of all of which are hereby incorporated by reference in their entireties.

TECHNICAL FIELD

The present application relates to the technical field of dishwashers, and in particular to a heat exchange device and a dishwasher.

BACKGROUND

At present, commonly used dishwashers usually use water from spray arms to clean tableware placed on bowl baskets. Since water needs to be heated to a certain temperature in the process of washing the tableware, an electric heating method is usually used to heat the water. Electric heaters and water pumps are arranged at the bottom of the dishwashers, the heated water is pumped into the spray arms by the water pumps, and the water flows back to water cups after the tableware is cleaned. The water is filtered and reheated for cyclic cleaning. In order to meet the energy-saving requirement, a heat pump device is used for heating in a patent. However, at present, a refrigerant in the heat pump device is generally heated by air through thermal conduction, and the noise is obvious.

SUMMARY OF THE DISCLOSURE

The present disclosure at least provides a heat exchange device and a dishwasher.

A first aspect of the present disclosure provides a heat exchange device including an evaporator, a first liquid storage tank, a second liquid storage tank, and a power unit. The evaporator defines a medium inlet and a medium outlet. The first liquid storage tank is in communication with the medium inlet. The second liquid storage tank is in communication with the medium outlet, the second liquid storage tank is in communication with the first liquid storage tank, and the second liquid storage tank defines a liquid inlet and an exhaust hole. The power unit is arranged between the evaporator and the first liquid storage tank, or between the evaporator and the second liquid storage tank, and configured to drive a liquid medium to circulate among the first liquid storage tank, the evaporator, and the second liquid storage tank.

In some embodiments, the second liquid storage tank and the evaporator are arranged on a mounting surface of the first liquid storage tank, and a distance from the highest point of the second liquid storage tank to the mounting surface is greater than a distance from the highest point of the evaporator to the mounting surface.

In some embodiments, a mounting groove is defined in the mounting surface, and the evaporator is embedded in the mounting groove; and a first outlet is defined in the mounting groove, and the outlet is in communication with the medium inlet.

In some embodiments, the first liquid storage tank defines a first inlet, and the second liquid storage tank is in communication with the first inlet; and the first liquid storage tank includes two opposite corners on a diagonal of the first liquid storage tank, the first outlet is located on one of the two opposite corners, and the first inlet is located on the other of the two opposite corners.

In some embodiments, the medium inlet is located on a side wall of the evaporator, and the medium outlet is located on the top end of the evaporator.

In some embodiments, an input end of the power unit is in communication with the medium outlet of the evaporator, and the output end of the power unit is in communication with the second liquid storage tank.

In some embodiments, the second liquid storage tank defines a second inlet and a second outlet, the second outlet of the second liquid storage tank is in communication with the first liquid storage tank, and the second inlet of the second liquid storage tank is in communication with the medium outlet of the evaporator; and the liquid inlet is located on a side of the second outlet of the second liquid storage tank away from the second inlet of the second liquid storage tank, and the exhaust hole is located on a side of the second inlet of the liquid storage tank away from the second outlet of the second liquid storage tank.

In some embodiments, the heat exchange device includes a heater arranged in at least one of the first liquid storage tank and the second liquid storage tank.

A second aspect of the present disclosure provides a dishwasher, and the dishwasher includes the aforementioned heat exchange device.

In some embodiments, the dishwasher includes a heat pump device and a water cup, the heat pump device includes a condenser, a third outlet of the water cup is in communication with a water inlet of the condenser, and a water draining outlet of the water cup is configured to discharge sewage; and the water inlet of the condenser is located at a level higher than the third outlet of the water cup of the dishwasher, and the third outlet of the water cup is located at a level higher than the water draining outlet of the water cup.

In some embodiments, a second refrigerant outlet of the condenser, a second refrigerant inlet of the condenser, the water inlet of the condenser, a medium outlet of the evaporator, a first refrigerant outlet of the evaporator, and a first refrigerant inlet of the evaporator face towards the same direction.

In some embodiments, an input end of the power unit is in communication with the medium outlet of the evaporator, and an output end of the power unit is in communication with the second liquid storage tank.

In some embodiments, the medium outlet of the evaporator faces towards the power unit.

It is to be understood that the foregoing general description and the following detailed description are merely exemplary and illustrative, and are not intended to limit the present disclosure.

BRIEF DESCRIPTION OF THE DRAWINGS

The accompanying drawings here are incorporated into the specification and form a part of the present specification. These drawings illustrate the embodiments of the present disclosure and are used together with the specification to illustrate the technical solution of the present disclosure.

DETAILED DESCRIPTION

The technical solution in some embodiments of the present disclosure may be clearly and completely described in combination with accompanying drawings in some embodiments of the present disclosure. Obviously, the described embodiments are merely a part of the embodiments of the present disclosure, and not all embodiments. Based on the embodiments of the present disclosure, all other embodiments obtained by those of ordinary skill in the art without inventive effort are within the scope of the present disclosure.

Reference herein to "embodiment" means that, particular features, structures, or characteristics described in connection with embodiments may be included in at least one embodiment of the present disclosure. The phrase appearing in various positions in the specification does not necessarily refer to the same embodiment, nor an independent or alternative embodiment that is mutually exclusive with other embodiments. Those of ordinary skill in the art explicitly and implicitly understand that the embodiments described in the present disclosure may be combined with other embodiments.

In order to solve the problem of significant noise generated by heating the refrigerant through using the air in existing heat pump devices, some embodiments of the present disclosure provide a dishwasher 100, and the dishwasher 100 utilizes liquid medium to heat the refrigerant in the heat pump device. That is, the cold energy of the refrigerant in the heat pump device is absorbed by using a liquid cooling circulation mode, which greatly reduces the noise that is generated by heating the refrigerant, and may reduce energy consumption compared with the heating mode by using the electric heating only.

Figure 1:
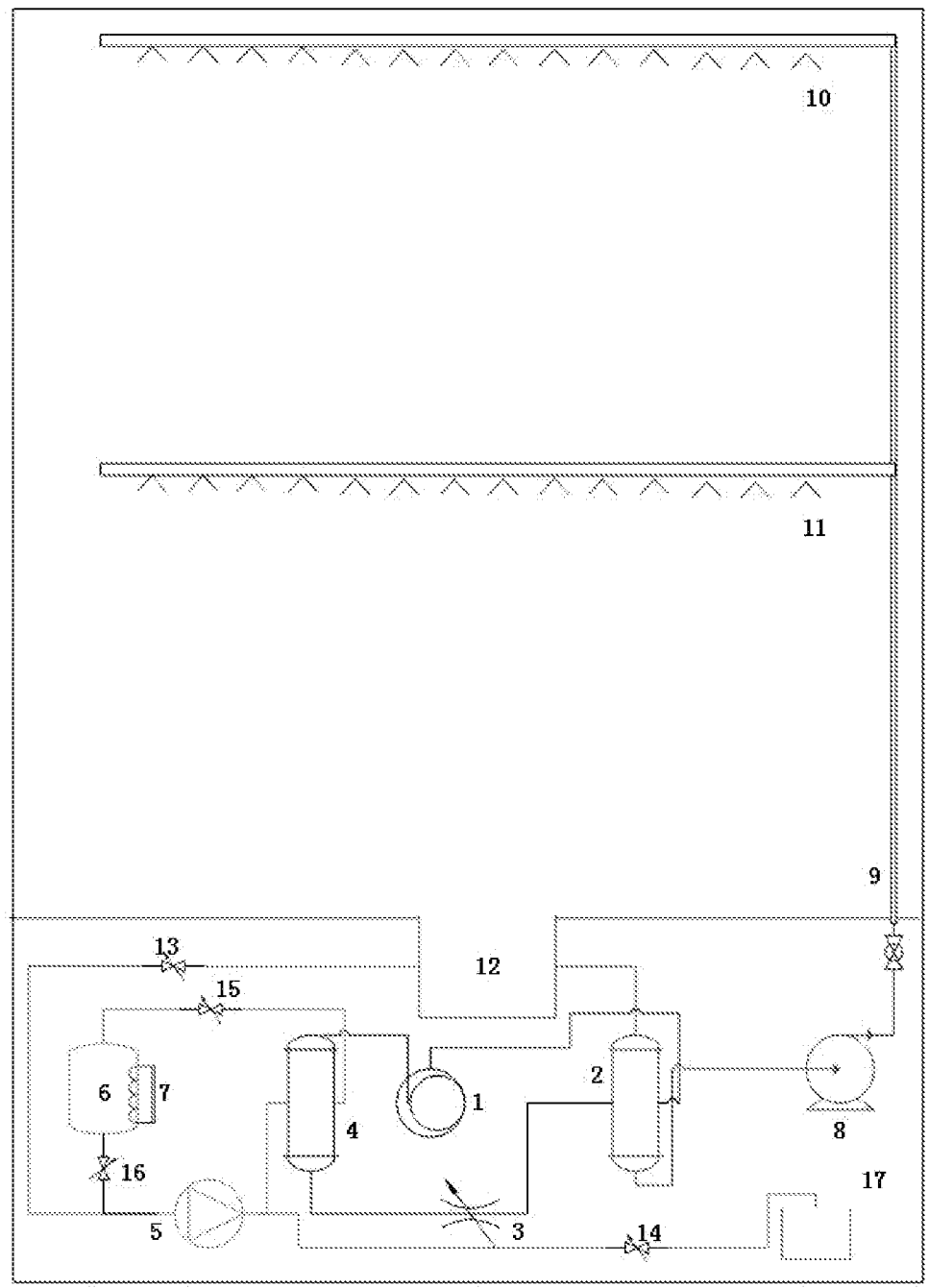
FIG. 1 is a structural schematic view of a dishwasher in some embodiments of the present disclosure.

As shown in FIG. 1, FIG. 1 is a structural schematic view of the dishwasher 100 in some embodiments of the present disclosure. The dishwasher 100 includes a washing water spraying device, a heat pump device, and a heat exchange device.

The heat pump device is configured to heat the washing water by the refrigerant. The washing water spraying device is configured to spray the washing water heated by the heat pump device into a cleaning cavity of the dishwasher 100 through a spraying arm 9, so as to wash dishes and the like in the cleaning cavity. In addition, the heat exchange device is configured to heat the refrigerant to ensure the heating efficiency of the refrigerant to the washing water.

The heat exchange device may include an evaporator 4, a liquid storage tank 6, and a power unit 5. The evaporator 4 includes a liquid medium channel and a refrigerant channel that are not in communication with each other or that are non-communicated with each other. The liquid medium channel may be connected to the refrigerant channel in a heat transfer manner or may be in heat transferring connection with the refrigerant channel. In this way, the refrigerant in the refrigerant channel may absorb the heat of the liquid medium in the liquid medium channel, and thus the refrigerant may be heated by the liquid medium. The power unit 5 is arranged between the evaporator 4 and the liquid storage tank 6, so as to drive the liquid medium to circulate and flow between the liquid storage tank 6 and the liquid medium channel of the evaporator 4. In this way, the refrigerant in the refrigerant channel of the evaporator 4 may be heated by the circulating liquid medium, thereby improving the heat exchange capability of the heat pump device. The circulating liquid medium circularly flowing in the heat exchange device may be water, salt water, or glycol solution (such as a mixture of glycol and water), etc.

The heat pump device may include a compressor 1 and a condenser 2. The condenser 2 may include a washing water channel and a refrigerant channel that are not in communication with each other or that are non-communicated with each other. The washing water channel may be connected to the refrigerant channel in a heat transfer manner. In this way, the washing water in the washing water channel may absorb the heat of the refrigerant in the refrigerant channel, and thus the washing water may be heated by the refrigerant. The compressor 1 is in communication with or fluidly connected to a first refrigerant outlet 44 of the evaporator 4 in the heat exchange device. The compressor 1 is also in communication with a second refrigerant inlet 23 of the condenser 2. A second refrigerant outlet 24 of the condenser 2 is in communication with a first refrigerant inlet 43 of the evaporator 4. In this way, the compressor 1, the refrigerant channel in the evaporator 4, the refrigerant channel in the condenser 2, and connecting pipelines among the compressor 1, the evaporator 4, and the condenser 2 together form a circulation channel of the refrigerant. In this way, the liquid refrigerant heated by the circulating liquid medium in the evaporator 4 may flow to the compressor 1; the compressor 1 may heat and pressurize the liquid refrigerant to change the liquid refrigerant into the high-temperature gas refrigerant or a gas refrigerant with a high temperature; the high-temperature gas refrigerant may enter the refrigerant channel of the condenser 2 through the second refrigerant inlet 23 of the condenser 2, and exchange heat with the washing water in the washing water channel of the condenser 2, so as to heat the washing water; and after the heat of the high-temperature gas refrigerant is absorbed by the washing water, the high-temperature gas refrigerant may be changed into a low-temperature liquid refrigerant or a liquid refrigerant with a lower temperature and flow out of the condenser 2 through the second refrigerant outlet 24 of the condenser 2, and then enters the evaporator 4 through the first refrigerant inlet 43 of the evaporator 4, so as to continue to heat the refrigerant flowing into the evaporator 4 by the liquid medium in the evaporator 4. This cycle is repeated to continuously heat the washing water flowing through the condenser 2.

In some embodiments, the heat pump device may further include a throttling unit 3. The second refrigerant outlet 24 of the condenser 2 is in communication with or fluidly connected to the first refrigerant inlet 43 of the evaporator 4 through the throttling unit 3, so as to reduce the pressure of the refrigerant through the throttling unit 3. The throttling unit 3 may be a throttling valve.

The washing water spraying device includes a circulating water pump 8, the spraying arm 9, and a water cup 12. The circulating water pump 8 is arranged between the condenser 2 of the heat pump device and the spraying arm 9. The spraying arm 9 is in communication with at least one nozzle (such as an upper nozzle 10 and a lower nozzle 11), so as to pump the washing water in the condenser 2 into the at least one nozzle through the spraying arm 9. A third outlet 121 of the water cup 12 is in communication with the water inlet of the condenser 2, so that when at least one nozzle sprays the washing water into a cleaning cavity and the washing water flows into the bottom of the cleaning cavity, the washing water may enter the condenser 2 through the third outlet 121 of the water cup 12 that is arranged at the bottom of the cleaning cavity, so as to continue the heating cycle.

In some embodiments, the dishwasher 100 may further include a drainage system for draining sewage from the cleaning cavity after the washing stage is completed. The drainage system may include a pump. A water inlet of the pump is in communication with a drainage outlet 122 of the water cup 12. A water outlet of the pump is in communication with a sewage outlet 17 of the dishwasher 100, so that the sewage in the water cup 12 may be drained out of the dishwasher 100 through the pump.

Figure 2:
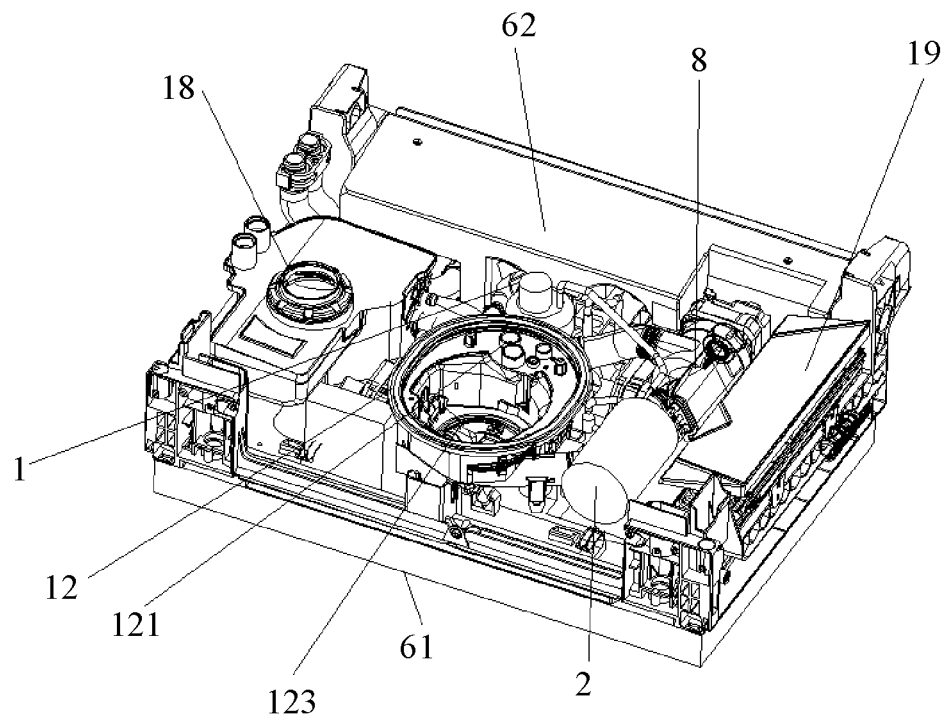
FIG. 2 is a structural schematic view of a dishwasher in some embodiments of the present disclosure.

In some embodiments, the power unit 5 in the heat exchange device may be used as the pump of the drainage system, so as to realize a pump with a drainage function and a liquid medium circulation function. As shown in FIG. 2, when the heat pump device is in operation, the liquid medium circulation is also in operation at the same time. In this case, liquid valves (15, 16) are switched on, drain valves (13, 14) are switched off. The circulation of the liquid medium is as follows. The liquid medium enters an input end of the pump through the liquid valves (15, 16) from a medium outlet 42 of the evaporator 4, flows out from an output end of the pump under the drive of the pump, and enters the liquid storage tank 6, continues to flow in the liquid storage tank 6 and then enters a medium inlet 41 of the evaporator 4, so that the liquid medium circulation is completed. When the washing circulation is completed, a drainage process is entered, at this time, the liquid valves (15, 16) are switched off, the drainage valves (13, 14) are switched on, and the sewage flows from the water draining outlet 122 of the water cup 12, flows through the pump, and flows out from the sewage outlet 17. In some embodiments, the pump of the drainage system and the power unit 5 of the heat exchange device are not the same element.

In some embodiments, as shown in FIG. 2, the dishwasher 100 may further include a water softener 18, so as to soften the washing water by the water softener 18 and transport the softened washing water into the water cup 12 through the pipelines. In some embodiments, the water softener 18 may be in communication with a water return port 123 of the water cup 12, so as to transport the softened washing water into the water cup 12 through the water return port 123.

The dishwasher 100 may further includes a controller 19. The controller 19 is configured to control the heat exchange device, the heat pump device, the drainage system, etc.

The present disclosure further provides the following improvements to the heat exchange device on the basis of the overall structure of the dishwasher 100 described above.

Figure 3:
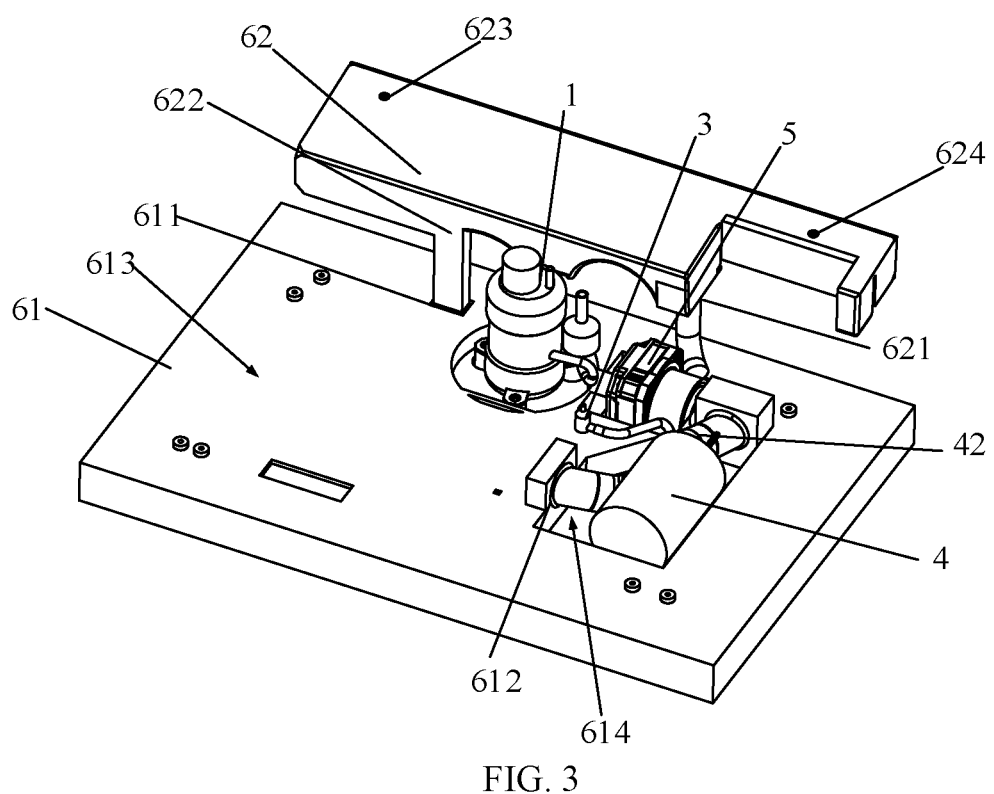
FIG. 3 is a structural schematic view of a heat exchange device in some embodiments of the present disclosure.
Figure 4:
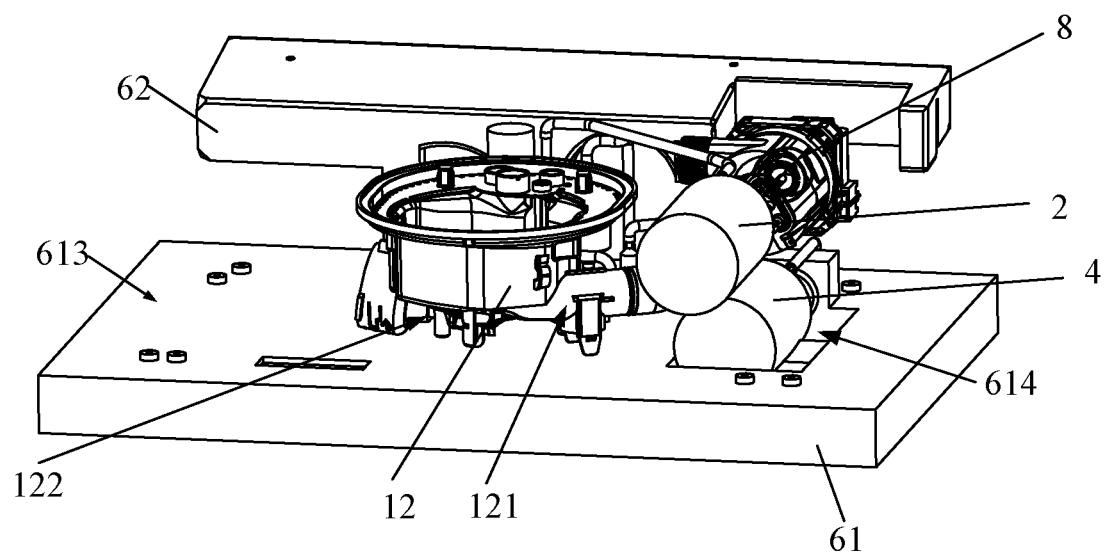
FIG. 4 is a structural schematic view of a heat exchange device in some embodiments of the present disclosure.

In some embodiments, as shown in FIGS. 3 and 4, the liquid storage tank 6 of the heat exchange device may include a first liquid storage tank 61 and a second liquid storage tank 62, so as to allow the liquid medium to fully flow through the first liquid storage tank 61 and the second liquid storage tank 62, thereby improving the heat exchange efficiency of the heat exchange device. In some embodiments, the first liquid storage tank 61 is in communication with the medium inlet 41 of the evaporator 4. The second liquid storage tank 62 is in communication with the medium outlet 42 of the evaporator 4. The second liquid storage tank 62 is further in communication with the first liquid storage tank 61. In this way, the liquid medium in the heat exchange device first flows from the first liquid storage tank 61 to the evaporator 4, then flows from the evaporator 4 to the second liquid storage tank 62, and then flows from the second liquid storage tank 62 back to the first liquid storage tank 61, so that the liquid medium may circulate in the heat exchange device. The power unit 5 may be arranged between the evaporator 4 and the second liquid storage tank 62. An input end of the power unit 5 is in communication with the medium outlet 42 of the evaporator 4, and an output end of the power unit 5 is in communication with the second liquid storage tank 62, thereby providing power for the liquid medium to circulate between the first liquid storage tank 61, the evaporator 4, and the second liquid storage tank 62. In some embodiments, the power unit 5 may be arranged between the first liquid storage tank 61 and the evaporator 4, thereby providing power for the liquid medium to circulate between the first liquid storage tank 61, the evaporator 4, and the second liquid storage tank 62.

The first liquid storage tank 61 may define a first outlet 612 and a first inlet 611, so that the first liquid storage tank 61 is in communication with the medium inlet 41 of the evaporator 4 through the first outlet 612, and in communication with the second liquid storage tank 62 through the first inlet 611. In some embodiments, the first outlet 612 and the first inlet 611 of the first liquid storage tank 61 may be respectively located on the two opposite corners on a diagonal of the first liquid storage tank 61, so that the liquid medium may fully flow in the first liquid storage tank 61, the temperature of the liquid medium in the first liquid storage tank 61 may be relatively balanced, and the heating efficiency of the heat exchange device may be improved.

In some embodiments, the second liquid storage tank 62 may be provided with a second outlet 622 and a second inlet 621, so that the second liquid storage tank 62 may be in communication with the first inlet 611 of the first liquid storage tank 61 through the second outlet 622, and in communication with the medium outlet 42 of the evaporator 4 through the second inlet 621. In some embodiments, the second outlet 622 and the second inlet 621 of the second liquid storage tank 62 are respectively located on two opposite ends of the second liquid storage tank 62, so that the liquid medium may fully flow in the second liquid storage tank 62, the temperature of the liquid medium in the second liquid storage tank 62 may be relatively balanced, and the heating efficiency of the heat exchange device may be improved.

The first liquid storage tank 61 and the second liquid storage tank 62 may be arranged in an upper and lower arrangement manner. That is, one of the first liquid storage tank 61 and the second liquid storage tank 62 is arranged above the other of the first liquid storage tank 61 and the second liquid storage tank 62. In some embodiments, one of the first liquid storage tank 61 and the second liquid storage tank 62 is located on a side of the other of the first liquid storage tank 61 and the second liquid storage tank 62 away from the cleaning cavity. In this way, the flow efficiency of the liquid medium in the heat exchange device is accelerated by using the downward flow property of the liquid medium. In some embodiments, the second liquid storage tank 62 is arranged above the first liquid storage tank 61, that is, in the dishwasher 100, the first liquid storage tank 61 is located on a side of the second liquid storage tank 62 away from the cleaning cavity. In some embodiments, the first liquid storage tank 61 may be arranged above the second liquid storage tank 62, that is, in the dishwasher 100, the second liquid storage tank 62 is located on a side of the first liquid storage tank 61 away from the cleaning cavity.

A liquid inlet 623 may be defined in the second liquid storage tank 62 located above. Since the first liquid storage tank 61 and the second liquid storage tank 62 are in communication with each other, the liquid medium may be filled into the first liquid storage tank 61 located below through the liquid inlet 623 of the second liquid storage tank 62 located above. When the liquid medium is filled to the highest water level in the second liquid storage tank 62 located above through the liquid inlet 623, the first liquid storage tank 61 located below is also filled with the liquid medium. The second liquid storage tank 62 located above may define a liquid inlet 623 at the highest point thereof. In this way, the first liquid storage tank 61 and the second liquid storage tank 62 may be filled with the liquid medium through the liquid inlet 623. In some embodiments, the liquid inlet 623 may be arranged on one side of the second outlet 622 of the second liquid storage tank 62 located above away from the second inlet 621 of the second liquid storage tank 62 located above, or the liquid inlet 623 may also be arranged on one side of the second inlet 621 of the second liquid storage tank 62 located above away from the second outlet 622 of the second liquid storage tank 62 located above.

In some embodiments, an exhaust hole 624 may be defined in the second liquid storage tank 62 located above. In this way, gas in the second liquid storage tank 62 located above may be exhausted or discharged through the exhaust hole 624 during the circulation of the liquid medium. The exhaust hole 624 may be arranged at one side of the second inlet 621 of the second liquid storage tank 62 located above away from the second outlet 622 of the second liquid storage tank 62 located above, which facilitates timely exhausting redundant or excess gas in the liquid storage tank 6 during the circulation of the liquid medium. In some embodiments, the exhaust hole 624 and the liquid inlet 623 may be respectively located on two opposite ends of the second liquid storage tank 62 located above, to reduce the occurrence of exhausting the liquid medium just filled into the liquid storage tank 6 to the outside of the liquid storage tank 6 through the exhaust hole 624.

In some embodiments, the first liquid storage tank 61 located below may be used as a support member configured to support the second liquid storage tank 62 located above, the power unit 5, the evaporator 4, the heat pump device, and the like. That is, the first liquid storage tank 61 located below may be arranged on the bottom of the dishwasher 100, and the second liquid storage tank 62 located above, the power unit 5, the evaporator 4, the heat pump device, and the like are arranged above the first liquid storage tank 61 located below.

In some embodiments, as shown in FIG. 4, a mounting surface 613 may be formed on the first liquid storage tank 61 located below, so that the second liquid storage tank 62 located above, the power unit 5, the evaporator 4, the heat pump device, and the like may be arranged on the mounting surface 613.

In order to balance the weight distribution of the dishwasher 100, the size of the second liquid storage tank 62 located above may be smaller than the size of the first liquid storage tank 61 located below. For example, at least one of the length and the width of the second liquid storage tank 62 located above is smaller than at least one of the length and the width of the first liquid storage tank 61 located below, that is, the length of the second liquid storage tank 62 located above is smaller than the length of the first liquid storage tank 61 located below; or the width of the second liquid storage tank 62 located above is smaller than the width of the first liquid storage tank 61 located below; or the length of the second liquid storage tank 62 located above is smaller than the length of the first liquid storage tank 61 located below and the width of the second liquid storage tank 62 located above is smaller than the width of the first liquid storage tank 61 located below. In this way, the second liquid storage tank 62 located above may be located in partial area of the mounting surface 613; the power unit 5, the evaporator 4, the heat pump device, and other components may be located in the remaining area of the mounting surface 613. The mounting surface 613 is divided into two adjacent areas: a left area and a right area adjacent to each other, or a front area and a rear area adjacent to each other. One of the divided two areas may be used as the partial area of the mounting surface 613 to arrange the second liquid storage tank 62 located above, and the other of the divided two areas is used as the remaining area of the mounting surface 613 to arrange the power unit 5, the evaporator 4, and the heat pump device, and the like. In some embodiments, the mounting surface 613 is divided into two adjacent areas: a front area and a rear area. The second liquid storage tank 62 located above is arranged on the rear area, and the power unit 5, the evaporator 4, the heat pump device, and the like are arranged on the front area, to further improve the balance of the weight distribution of the chassis of the dishwasher 100.

The evaporator 4 may also be located on the mounting surface 613. For the evaporator 4, the distance from the highest point of the evaporator 4 to the mounting surface 613 of the first liquid storage tank 61 located below may be smaller or less than the distance from the highest point of the second liquid storage tank 62 located above to the mounting surface 613 of the first liquid storage tank 61 located below. In other words, the distance between the evaporator 4 and the cleaning cavity may be greater than the distance between the second liquid storage tank 62 located above and the cleaning cavity. Generally speaking, the highest point of the evaporator 4 is lower than the highest point of the second liquid storage tank 62 located above, so that the first liquid storage tank 61 located below and the evaporator 4 may be filled with the liquid medium after the second liquid storage tank 62 located above is filled with the liquid medium. In this way, it is possible to reduce the occurrence of insufficient heat exchange due to the lack of the liquid medium in the evaporator 4.

At least part of the evaporator 4 may be embedded in the first liquid storage tank 61 located below. In this way, when the first liquid storage tank 61 located below is filled with the liquid medium, the liquid medium in the first liquid storage tank 61 located below may automatically flow into the evaporator 4, so that the liquid medium may circulate among the first liquid storage tank 61, the evaporator 4, and the second liquid storage tank 62 only by arranging the power unit 5 between the evaporator 4 and the second liquid storage tank 62 located above.

In some embodiments, a mounting groove 614 is defined in the mounting surface 613 of the first liquid storage tank 61 located below. The evaporator 4 is embedded in the mounting groove 614. In this way, at least part of the evaporator 4 may be embedded in the first liquid storage tank 61 located below. In some embodiments, the first outlet 612 is defined in the mounting groove 614. The first liquid storage tank 61 located below is in communication with the medium inlet 41 of the evaporator 4 through the first outlet 612. In this way, the liquid medium in the first liquid storage tank 61 located below may automatically flow into the evaporator 4 when the first liquid storage tank 61 located below is filled with the liquid medium.

Figure 5:
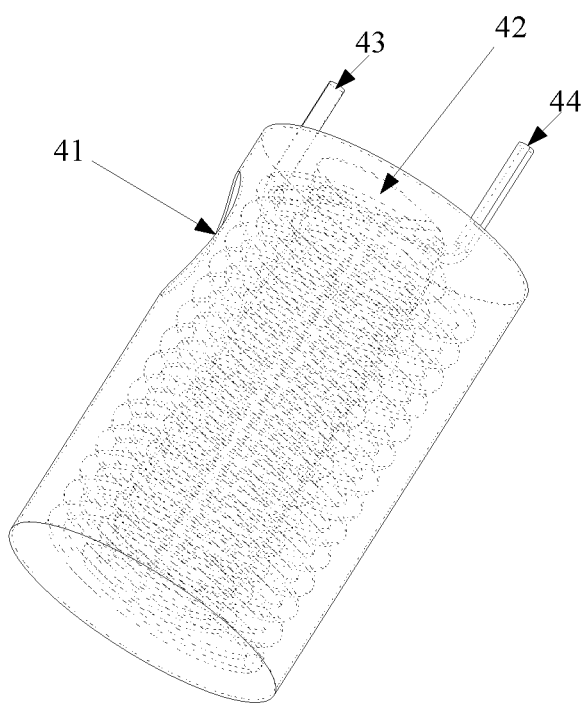
FIG. 5 is a structural schematic view of an evaporator in some embodiments of the present disclosure.

As shown in FIG. 5, the evaporator 4 may be cylindrical. The medium inlet 41 of the evaporator 4 is located or defined on a side wall of the evaporator 4. In this way, the first outlet 612 may be defined on the wall of the mounting groove 614 at a position adjacent to the medium inlet 41. The length of a first pipeline (not shown in the figure) communicating the first outlet 612 with the medium inlet 41 may be reduced, and the first pipeline may be conveniently arranged. In some embodiments, the medium outlet 42 of the evaporator 4 is located on the top end of the evaporator 4. The medium outlet 42 of the evaporator 4 may face towards the power unit 5. Thus, it is convenient to arrange a second pipeline (not shown in the figure) that is in communication with the medium outlet 42 and the power unit 5. The first refrigerant inlet 43 and the first refrigerant outlet 44 of the evaporator 4 may also be located on the top end of the evaporator 4.

Figure 6:
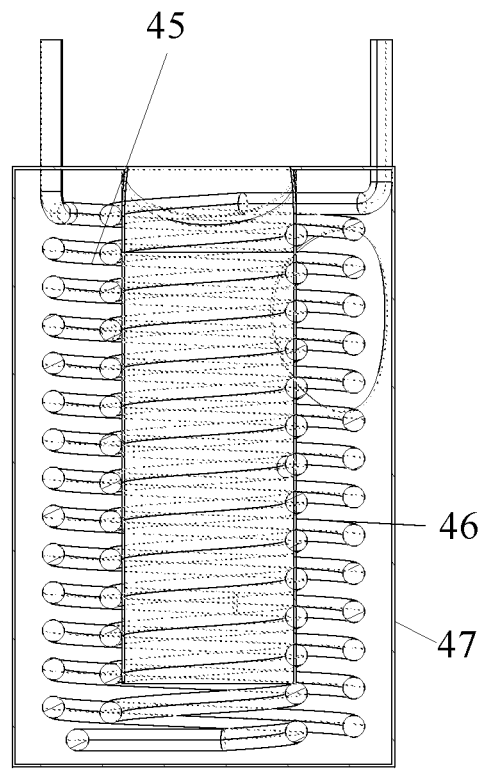
FIG. 6 is a cross-sectional structural schematic view of the evaporator in some embodiments of the present disclosure.

As shown in FIG. 6, the evaporator 4 includes a container 47 and a refrigerant pipe 45. The container 47 is configured to contain the liquid medium. The refrigerant pipe 45 is spirally arranged in the container 47. In this way, the liquid medium contained in the container 47 may exchange heat with the refrigerant in the refrigerant pipe 45. The contact area between the refrigerant pipe 45 and the liquid medium in the container 47 may be increased through spiral arrangement of the refrigerant pipe 45, thereby improving the heat exchange efficiency. In some embodiments, the evaporator 4 may further includes an inner pipe 46. The inner pipe 46 is inserted into the container 47, and the refrigerant pipe 45 is arranged between the container 47 and the inner pipe 46. An outlet (i.e., the medium outlet) of the inner pipe 46 and the medium inlet are located on the same end of the container 47. In this way, the liquid medium first enters the container 47 from one end of the container 47, then the liquid medium flows to the other end of the container 47, and then the liquid medium flows through the inner pipe 46 and flows back to the one end of the container 47, and further flows out of the evaporator 4 from the one end of the container 47. In this way, the liquid medium may fully flow in the evaporator 4, the temperature balance of the liquid medium in the evaporator 4 is improved, and the heat exchange efficiency of the evaporator 4 is improved.

The power unit 5 may also be arranged on the mounting surface 613. In some embodiments, the power unit 5 may also be embedded in the mounting groove 614.

In some embodiments, a protruding communication part may be formed in the first liquid storage tank 61 located below, to communicate the input end of the power unit 5 with the medium outlet 42 of the evaporator 4 through the communication part. Thus, a mounting position having a size adapted to or matching with a size of the power unit 5 is formed on the mounting surface 613 of the first liquid storage tank 61 located below through the communication part, and the power unit 5 may be exactly embedded in the mounting position, so as to fix the power unit 5. In some embodiments, a liquid outlet and a liquid inlet may be defined on the communication part. The liquid inlet of the communication part is in communication with the medium outlet 42 of the evaporator 4, and the liquid outlet of the communication part is in communication with the input end of the power unit 5.

In some embodiments, the power unit 5 may be a power element, such as a pump, etc.

The heat exchange device may include a heater 7 arranged in the first liquid storage tank 61 and/or the second liquid storage tank 62. That is, the heat exchange device may include a first heater arranged in the first liquid storage tank 61, and/or a second heater arranged in the second liquid storage tank 62. The liquid medium in the first liquid storage tank 61 and/or the liquid medium in the second liquid storage tank 62 may be heated by the first heater and/or the second heater, so that the temperature of the liquid medium in the first liquid storage tank 61 and the temperature of the liquid medium in the second liquid storage tank 62 may be maintained in a suitable temperature range capable of heating the refrigerant in the evaporator 4.

The first heater may be a heating tube assembly or a heating wire assembly. In some embodiments, the first heater may be a heating wire assembly, so as to control the temperature of the liquid medium in the first liquid storage tank 61 within a suitable temperature range (for example, from 5 degrees Celsius to 20 degrees Celsius), thereby improving the accuracy of controlling the temperature of the liquid medium in the first liquid storage tank 61.

In some embodiments, the first heater may include a first heating wire and a first heat conductive tape or band that are connected in a heat transfer manner. In this way, the heat of the first heating wire may be uniformly conducted to the liquid medium in the first liquid storage tank 61 through the first heat conductive tape, to achieve the purpose of uniformly heating the liquid medium in the first liquid storage tank 61 by the first heater. In some embodiments, the first heating wire may be wrapped in the first heat conductive tape, so that the first heating wire is not directly contacted with the liquid medium in the first liquid storage tank 61, and the first heating wire may uniformly and indirectly conduct heat to the liquid medium through the first heat conductive tape, thereby improving the uniformity of the temperature of the liquid medium in the first liquid storage tank 61.

In some embodiments, the first heater may be arranged in the first liquid storage tank 61, and may also be arranged outside of the first liquid storage tank 61, which is not limited here.

In some embodiments, the second heater may also include a second heating wire and a second heat conductive tape that are connected in a heat transfer manner. The relative positions of the second heating wire, the second heat conductive tape, and the second liquid storage tank 62 may be the same as the relative positions of the first heating wire, the first heat conductive tape, and the first liquid storage tank 61, which are not repeated here.

On the basis of the overall structure of the dishwasher 100 and the heat exchange device, the present disclosure makes the following improvements to the connecting mode of the heat exchange device and the heat pump device.

Figure 7:
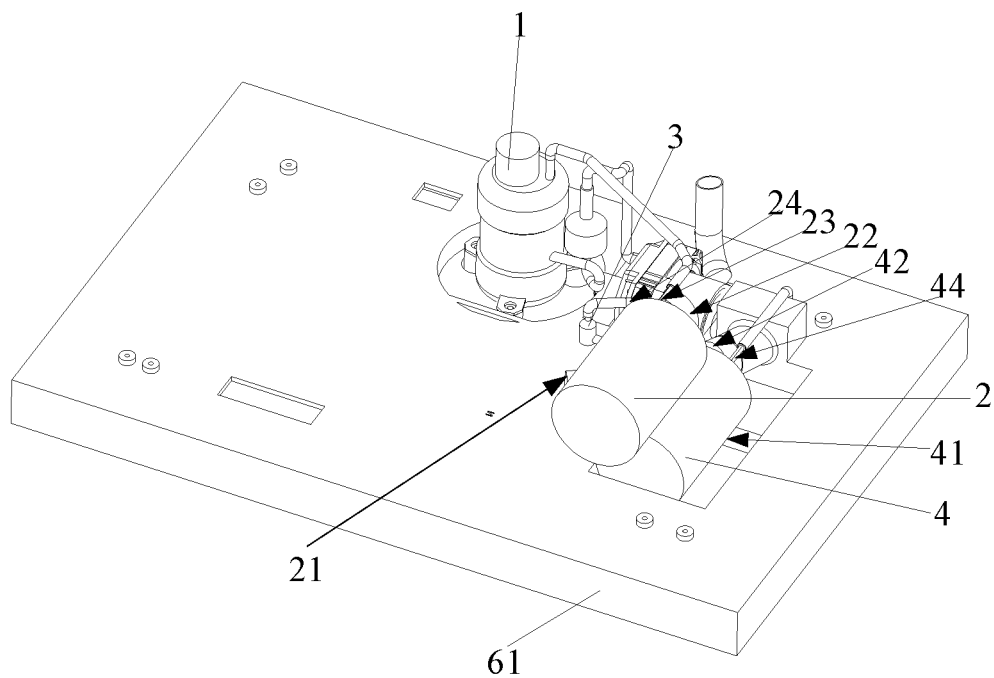
FIG. 7 is a schematic view illustrating a connection mode between the heat exchange device and a heat pump device in some embodiments of the present disclosure.

As shown in FIG. 7, in the assembling process of the dishwasher 100, the heat pump device and the evaporator 4 may be embedded in the first liquid storage tank 61 located below as a whole. That is, the heat pump device and the evaporator 4 are first assembled together to form an assembled part, and then the assembled part is embedded in the first liquid storage tank 61 located below as a whole, so as to realize modularization and simplification.

In some embodiments, the water inlet 21 of the condenser 2 may be at a level higher than the third outlet 121 of the water cup 12. The third outlet 121 of the water cup 12 may be at a level higher than the water draining outlet 122 of the water cup 12, so that the residual washing water in the water cup 12 (the washing water below the third outlet 121 of the water cup 12) cannot enter the condenser 2 at the end of the circulation, and the washing water in the condenser 2 is completely drained, so that no residual water is remained in the condenser 2 at the end of the circulation.

In some embodiments, the condenser 2 may be arranged above the evaporator 4, so as to facilitate the arrangement of the connection pipeline not shown in the figure) between the condenser 2 and the evaporator 4, and easily meet the requirements of the heights of the mounting positions of the evaporator 4 and the condenser 2. The water inlet 21, the second refrigerant inlet 23, and the second refrigerant outlet 24 of the condenser 2; and the medium inlet 41, the first refrigerant outlet 44, and the first refrigerant inlet 43 of the evaporator 4 may all face towards the same direction, such as face towards the power unit 5, and the connection pipeline between the condenser 2 and the evaporator 4 may be conveniently arranged. In some embodiments, the water inlet 21, the second refrigerant inlet 23, and the second refrigerant outlet 24 of the condenser 2 may be all located on the top end of the condenser 2, so that an axis of the condenser 2 is substantially parallel to the width direction of the first liquid storage tank 61.

In some embodiments, the evaporator 4 and the condenser 2 may be arranged side by side, and the axis of the condenser 2 may be substantially parallel to the axis of the evaporator 4.

The condenser 2 and the evaporator 4 may be heat exchange devices with the same structure and size, so that the condenser 2 and the evaporator 4 may be assembled together. In some embodiments, the parameters of the condenser 2 and the evaporator 4 may be the same, that is, the condenser 2 and the evaporator 4 may have completely consistent structural parameters and heat exchange performance.

The effects of the present disclosure are as follows. The dishwasher provided by some embodiments of the present disclosure uses the liquid medium to heat the refrigerant in the heat pump device. That is, the cold energy of the refrigerant in the heat pump device is absorbed by using the liquid cooling circulation mode, which greatly reduces the noise generated by heating the refrigerant and reduces the energy consumption compared with the heating mode by using the electric heating only. The liquid storage tank of the heat exchange device may include the first liquid storage tank and the second liquid storage tank. The power unit is configured to provide power for a liquid medium to circulate among the first liquid storage tank, the evaporator, and the second liquid storage tank, so that the liquid medium is fully circulated through the two liquid storage tanks and the power unit, thereby improving the heat exchange efficiency of the heat exchange device.

The foregoing descriptions are merely embodiments of the present disclosure and are not intended to limit the scope of the present disclosure. Any equivalent structure or equivalent process transformation made using the description and accompanying drawings of the present disclosure, or directly or indirectly applied in other related technical fields, is equally included in the scope of patent protection of the present disclosure.

What is claimed is:

1. A heat exchange device, comprising:
   an evaporator, defining a medium inlet and a medium outlet;
   a first liquid storage tank in communication with the medium inlet;
   a second liquid storage tank in communication with the medium outlet, wherein the second liquid storage tank is in communication with the first liquid storage tank, and the second liquid storage tank defines a liquid inlet and an exhaust hole; and
   a power unit, arranged between the evaporator and the first liquid storage tank, or between the evaporator and the second liquid storage tank, and configured to drive a liquid medium to circulate among the first liquid storage tank, the evaporator, and the second liquid storage tank, wherein the second liquid storage tank and the evaporator are arranged on a mounting surface of the first liquid storage tank, and a distance from the highest point of the second liquid storage tank to the mounting surface is greater than a distance from the highest point of the evaporator to the mounting surface.

2. The heat exchange device as claimed in claim 1, wherein a mounting groove is defined in the mounting surface, and the evaporator is embedded in the mounting groove; and
   a first outlet is defined in the mounting groove, and the first outlet is in communication with the medium inlet.

3. The heat exchange device as claimed in claim 2, wherein the first liquid storage tank defines a first inlet, and the second liquid storage tank is in communication with the first inlet; and
   the first liquid storage tank comprises two opposite corners on a diagonal of the first liquid storage tank, the first outlet is located on one of the two opposite corners, and the first inlet is located on the other of the two opposite corners.

4. The heat exchange device as claimed in claim 2, wherein the medium inlet is located on a side wall of the evaporator, and the medium outlet is located on a top end of the evaporator.

5. The heat exchange device as claimed in claim 1, wherein the second liquid storage tank defines a second inlet and a second outlet, the second outlet of the second liquid storage tank is in communication with the first liquid storage tank, and the second inlet of the second liquid storage tank is in communication with the medium outlet of the evaporator; and
   the liquid inlet is located on a side of the second outlet of the second liquid storage tank away from the second inlet of the second liquid storage tank, and the exhaust hole is located on a side of the second inlet of the second liquid storage tank away from the second outlet of the second liquid storage tank.

6. The heat exchange device as claimed in claim 1, wherein the heat exchange device comprises a first heater arranged in the first liquid storage tank and/or a second heater arranged in the second liquid storage tank.

7. The heat exchange device as claimed in claim 1, wherein an input end of the power unit is in communication with the medium outlet of the evaporator, and an output end of the power unit is in communication with the second liquid storage tank.

8. The heat exchange device as claimed in claim 1, wherein the medium outlet of the evaporator faces towards the power unit.

9. A dishwasher, comprising:
   a heat exchange device, comprising:
      an evaporator, defining a medium inlet and a medium outlet;
      a first liquid storage tank, in communication with the medium inlet;
      a second liquid storage tank, in communication with the medium outlet, wherein the second liquid storage tank is in communication with the first liquid storage tank, and the second liquid storage tank defines a liquid inlet and an exhaust hole;

a power unit, arranged between the evaporator and the first liquid storage tank, or between the evaporator and the second liquid storage tank, and configured to drive a liquid medium to circulate among the first liquid storage tank, the evaporator, and the second liquid storage tank;

a condenser and a water cup, wherein a third outlet of the water cup is in communication with a water inlet of the condenser, and a water draining outlet of the water cup is configured to discharge sewage; and the water inlet of the condenser is located at a level higher than the third outlet of the water cup of the dishwasher, and the third outlet of the water cup is located at a level higher than the water draining outlet of the water cup.

10. The dishwasher as claimed in claim 9, wherein a second refrigerant outlet of the condenser, a second refrigerant inlet of the condenser, the water inlet of the condenser, a medium outlet of the evaporator, a first refrigerant outlet of the evaporator, and a first refrigerant inlet of the evaporator face towards the same direction.

11. The dishwasher as claimed in claim 9, wherein the second liquid storage tank and the evaporator are arranged on a mounting surface of the first liquid storage tank, and a distance from the highest point of the second liquid storage tank to the mounting surface is greater than a distance from the highest point of the evaporator to the mounting surface.

12. The dishwasher as claimed in claim 11, wherein a mounting groove is defined in the mounting surface, and the evaporator is embedded in the mounting groove; and a first outlet is defined in the mounting groove, and the outlet is in communication with the medium inlet.

13. The dishwasher as claimed in claim 12, wherein the first liquid storage tank defines a first inlet, and the second liquid storage tank is in communication with the first inlet; and the first liquid storage tank comprises two opposite corners on a diagonal of the first liquid storage tank, the first outlet is located on one of the two opposite corners, and the first inlet is located on the other of the two opposite corners.

14. The dishwasher as claimed in claim 12, wherein the medium inlet is located on a side wall of the evaporator, and the medium outlet is located on a top end of the evaporator.

15. The dishwasher as claimed in claim 9, wherein the second liquid storage tank defines a second inlet and a second outlet, the second outlet of the second liquid storage tank is in communication with the first liquid storage tank, and the second inlet of the second liquid storage tank is in communication with the medium outlet of the evaporator; and the liquid inlet is located on a side of the second outlet of the second liquid storage tank away from the second inlet of the second liquid storage tank, and the exhaust hole is located on a side of the second inlet of the second liquid storage tank away from the second outlet of the second liquid storage tank.

16. The dishwasher as claimed in claim 9, wherein the heat exchange device comprises a first heater arranged in the first liquid storage tank and/or a second heater arranged in the second liquid storage tank.

17. The dishwasher as claimed in claim 9, wherein an input end of the power unit is in communication with the medium outlet of the evaporator, and an output end of the power unit is in communication with the second liquid storage tank.

18. The dishwasher as claimed in claim 9, wherein the medium outlet of the evaporator faces towards the power unit.

* * * * *